Jan. 22, 1963   R. PRINCE   3,074,574
TRUCK FRAME AND RETRACTABLE TRUCK BED
Filed March 6, 1961   2 Sheets-Sheet 1
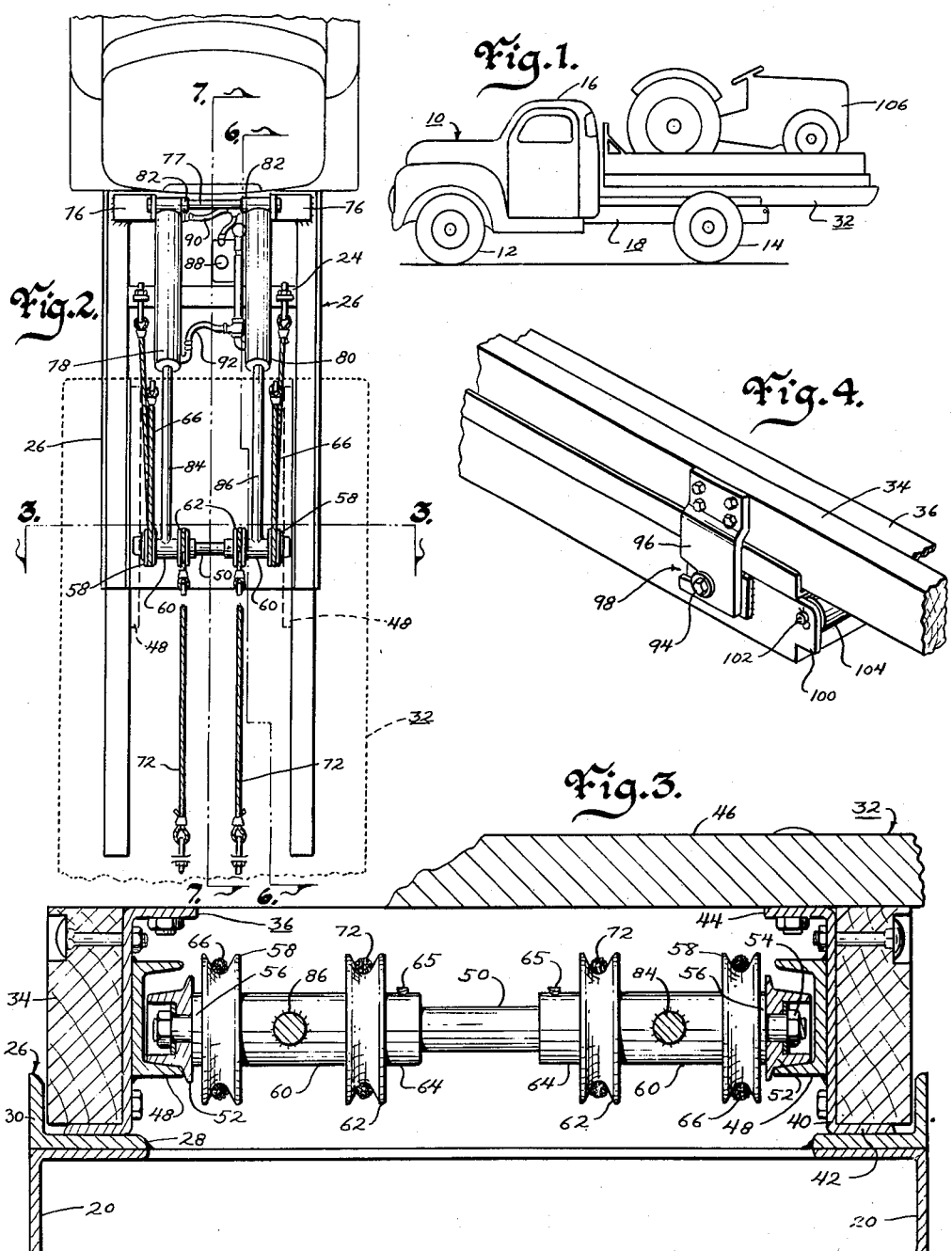
Inventor
Richard Prince
by Talbert Dick & Earley
Attorneys Jan. 22, 1963 R. PRINCE 3,074,574
TRUCK FRAME AND RETRACTABLE TRUCK BED
Filed March 6, 1961 2 Sheets-Sheet 2
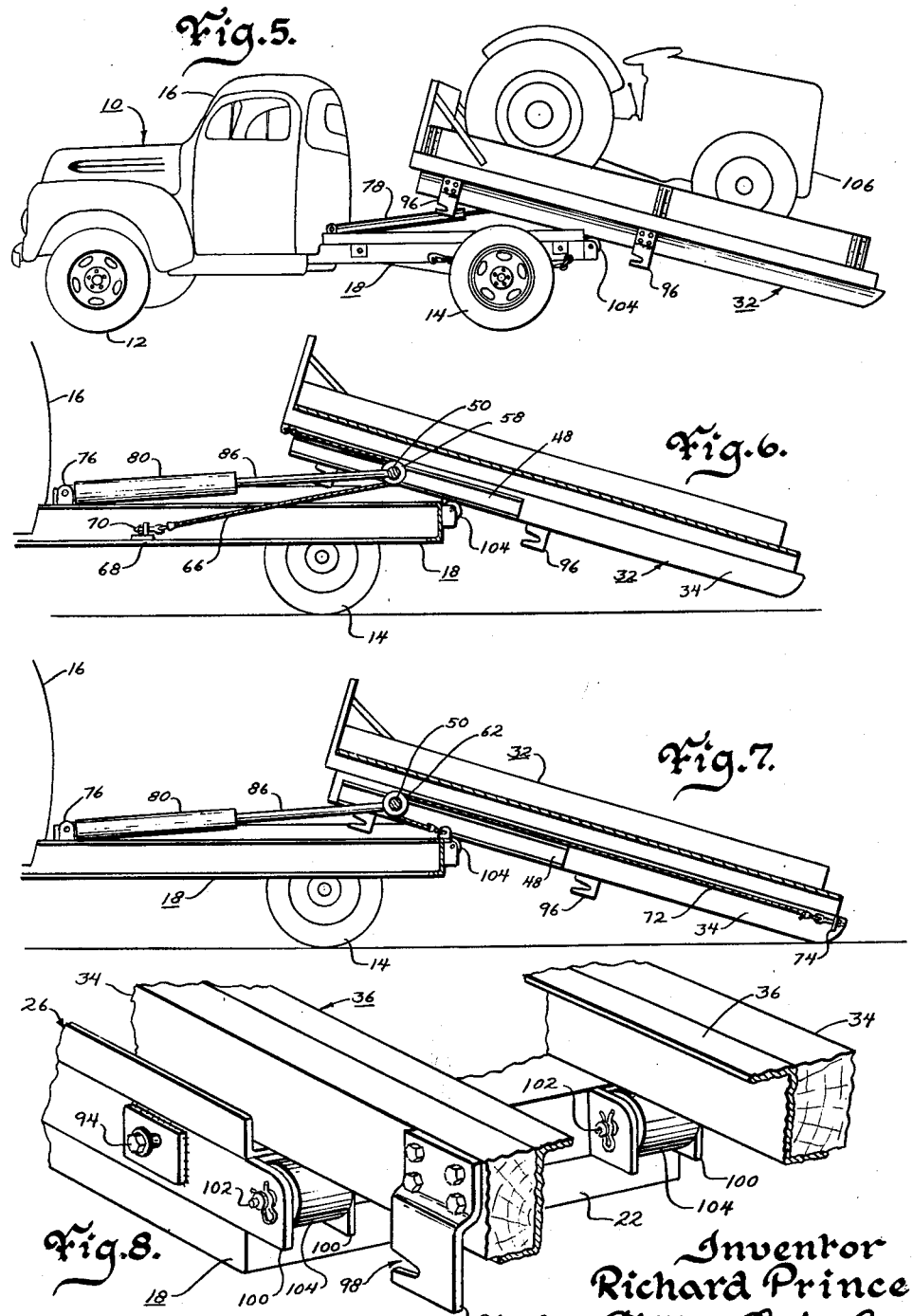

United States Patent Office 3,074,574
Patented Jan. 22, 1963

3,074,574
TRUCK FRAME AND RETRACTABLE TRUCK BED
Richard Prince, 405 Water St., Sioux City, Iowa
Filed Mar. 6, 1961, Ser. No. 93,706
2 Claims. (Cl. 214—505)

My invention relates to truck beds and more particularly to a truck bed that can be moved with respect to the truck frame under controlled conditions.

The problem of transporting tractors and other vehicles which are not designed for highway use has long been in existence. Low mounted trailers with detachable ramps have been used in some instances for very heavy equipment, but the cost of such trailers makes this arrangement very expensive. The beds of some trucks have been designed so that they can be tilted to enable a tractor to be driven thereon, and then the beds are retracted or moved back onto the truck frame so that the tractor can be carried by the truck. These units are also expensive, and a great part of their expense lies in the separate batteries of hydraulic cylinders employed to guide and control the truck bed through the various phases of its displacement.

Therefore, the principal object of my invention is to provide a truck frame with a retractable truck bed which can be completely moved throughout its cycle by a single battery of hydraulic cylinders.

A further object of my invention is to provide a truck frame with a retractable truck bed which is completely moved and controlled throughout its cycle by a single battery of hydraulic cylinders.

A still further object of my invention is to provide a truck frame with a retractable truck bed that is both efficient and safe to operate.

A still further object of my invention is to provide a truck frame with a retractable truck bed which will permit the truck bed to move to and from an inclined position under loaded conditions without subjecting the load to any violent or sudden impact or motion.

A still further object of my invention is to provide a truck frame with a retractable truck bed that can advantageously utilize the weight of the bed to assist in the tilting of the bed with respect to the truck frame.

A still further object of my invention is to provide a truck frame with a retractable truck bed that will be stabilized with respect to the truck frame when the truck bed is in its retracted, traveling position.

A still further object of my invention is to provide a truck frame with a retractable truck bed that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a line elevation of a truck with my retractable bed thereon in its traveling position. A tractor is shown mounted on the retractable bed;

FIG. 2 is a partial plan view of my device taken at a level just above the truck frame when the bed is in a tilted position to illustrate the interconnecting parts between the frame and bed;

FIG. 3 is a transverse sectional view through the truck frame and bed as viewed from a position on line 3—3 of FIG. 2;

FIG. 4 is a partial elevational view of my device showing a rearward corner of the truck bed in locked position with respect to the truck frame when the unit is in traveling position;

FIG. 5 is a perspective view of my device in a partially tilted position;

FIG. 6 is a sectional view of my device in a partially tilted position as viewed on line 6—6 of FIG. 2 and shows the cable configuration that controls the truck bed as the bed is being pushed to its tilted position;

FIG. 7 is a sectional view of my device in a fully tilted position as viewed on line 7—7 of FIG. 2 and shows the cable configuration that controls the truck bed as the bed is being pulled to its retracted position; and FIG. 8 is a partial perspective view of the rearward end of my device showing the rollers at the rearward portion of the truck frame.

I have used the numeral 10 to generally designate a truck having forward wheels 12, rearward wheels 14, cab 16 and frame 18. The frame 18 can be comprised of metal side beams 20 with a rearward end beam 22 and at least one intermediate cross beam 24. Angle members 26 can be welded to the side beams 20 to provide a horizontal track portion 28 and a vertical guide portion 30.

The truck bed 32 is comprised or parallel wooden side beams 34 which may have elongated brackets 36 secured thereto along the entire length thereof by bolts 38 or other convenient means. Brackets 36 are comprised of a vertical portion 40 which covers the inside face of beams 34; bottom portion 42 which substantially covers the bottom of beams 34, and an inwardly extending upper portion 44 which extends underneath the floor 46 of the truck bed 32.

As shown in FIGS. 3, 6 and 7, channels 48 are welded to vertical portion 40 of brackets 36 so that the flanges thereof extend inwardly toward the center of the bed 32. Channels 48, as will be shown hereafter, serve as a supporting track, and, as shown in FIGS. 6 and 7, extend from the front end to substantially the midpoint of each beam 34. A shaft 50 extends transversely across bed 32 between tracks or channels 48, and is rotatably mounted thereon by virtue of wheels 52 which are rotatably secured to the ends of the shaft by means of bearings 54. Bushings 56 separate wheels 52 and sheaves 58 which are rotatably mounted on shaft 50 adjacent the wheels. Sleeves 60 are rotatably mounted on shaft 50 and separate the two sheaves 58 from a second pair of sheaves 62 which are rotatably mounted on shaft 50 at a point removed from the ends thereof. Sleeves 64 are mounted on shaft 50 adjacent sheaves 62 and are rigidly secured to the shaft by set screws 65 which enable the bushings to hold sheaves 62 in place. As shown in FIGS. 2 and 6, cables 66 are secured by one of their respective ends to the bracket elements 68 which are welded to frame cross member 24. Cables 66 are then threaded substantially half way around sheaves 58 and then are secured by their other respective ends in any convenient fashion to the forward end of the floor 46 of bed 32. Cables 66 do not become crossed upon themselves at any time. The length of cables 66 can be adjusted by means of a threaded eyelet 70 which extends through and forms a part of bracket 68. As shown in FIG. 7, cables 72 are secured by one of their respective ends to brackets 74 on the rearward end of bed 32. Brackets 74 are identical in function to brackets 68. Cables 72 then extend forwardly and are threaded half way around sheaves 62, and thence rearwardly again where they are anchored by their other respective ends in any convenient fashion to the rearward end of truck frame 18.

As shown in FIG. 2, clip angles 76 are welded to the forward end of truck frame 18 and serve as a means of support for shaft 77 which extends therebetween. Double acting hydraulic cylinders 78 and 80 are pivotally secured in conventional fashion by one of their respective ends to shaft 77 and are held in spaced apart condition by stop elements 82 secured to shaft 77. The cylinders 78 and 80, and their respective piston rods 84 and 86 extend in a rearward direction from shaft 77 and the rearward ends of the piston rods are welded or otherwise secured to one each of the sleeves 60 on shaft 50.

A reservoir 88 of hydraulic fluid is connected in any convenient fashion to truck frame 18, and the reservoir is then connected to a conventional hydraulic pump (not shown). A T-hose fitting 90 connects reservoir 88 with the ports at the forward ends of cylinders 78 and 80, and a second hose fitting 92 connects reservoir 88 with the ports at the other ends of the cylinders. Fittings 90 and 92 enable the two cylinders 78 and 80 to act in unison each time hydraulic pressure is applied to the cylinders.

As shown in FIGS. 4, 5 and 8, anchor bolts 94 extend laterally from at least two points on the sides of frame 18. Brackets 96 are bolted or otherwise secured to truck bed 32 and have a horizontal slot 98 extending rearwardly from the forward edge thereof. Brackets 96 extend downwardly from truck bed 18 and are so spaced that anchor bolts 94 are received in slots 98 when the truck bed 32 is in its retracted traveling position on truck frame 18.

Pairs of parallel rearward extensions 100 protrude from the rearward end of truck frame 18 to serve as a means of support for horizontal pins 102. Rollers 104 are rotatably mounted on pins 102 and the tops of rollers 104 are in the same plane as the upper surface of the horizontal portions 28 of angles 26 which are welded on the sides of frame 18. This enables the rollers to lend support to truck bed 32 at times.

The normal operation of my device is as follows: When the truck bed 32 is in its retracted position on frame 18, as shown in FIG. 1, the piston rods 84 and 86 are withdrawn into cylinders 78 and 80, respectively, and shaft 50 is in its forwardmost position on tracks 48. The brackets 96 have engaged the anchor bolts 94 and the bed 32 is therefore held against any lateral tipping or movement with respect to the truck frame 18. The hydraulic fluid which has been forced into cylinders 78 and 80 through hose fitting 92 resists any rearward movement of the bed 32 with respect to the frame 18.

When it is desired to move bed 32 from the traveling position shown in FIG. 1 to the extreme tilted position shown in FIG. 7, the operator reverses the flow of hydraulic pressure so that fluid is introduced into cylinders 78 and 80 through fitting 90. This causes piston rods 84 and 86 to be pushed rearwardly out of cylinders 78 and 80, respectively. The rearward displacement of the piston rods starts an immediate rearward displacement of shaft 50 which is secured to the rearward end of the piston rods. As shown in FIG. 6, the rearward movement of shaft 50 exerts a rearward push on cable 66 which is threaded about sheave 58 on shaft 50. One end of cable 66 resists this pushing force because it is anchored to frame 18 by bracket 68. The other end of cable 66 is unable to resist this rearward force being exerted on the cable because it is secured to the forward end of truck bed 18, and there is nothing other than mere friction to prevent the rearward sliding movement of the bed over the tracks 28 which are provided by the angle members 26 on the sides of truck frame 18. As the truck bed 32 slides rearwardly on the truck frame 18, cable 66 moves over rotating sheave 58 and the truck bed moves rearwardly over the wheels 52 of shaft 50 along track 48. At the same time, cable 72 is rotating with the sheave 62 on shaft 50 to compensate for this change in position of the bed 32. When substantially the rearward half of the bed 32 protrudes out beyond the rearward end of the frame 18, the weight of the bed tends to cause its lower end to fall toward the ground surface. However, as this takes place, cylinders 78 and 80 pivot upwardly about shaft 77 to compensate for the rise in elevation of the forward end of the bed 32. The combined grip that both sets of cables 66 and 72 have on the respective sets of sheaves 58 and 62 prevents any unlimited and uncontrolled vertical displacement of the bed 32 with respect to the frame 18. As a result, the abnormal weight on the rearward portion of the unbalanced bed 32 institutes the gradual tilting action thereof, but the tilting is controlled and ultimately effected by the continued rearward movement of shaft 50.

When the bed 32 is in the position shown in FIG. 7, a tractor 106 can be driven onto the inclined bed and locked thereto in any convenient manner. The hydraulic pressure is then reversed in conventional fashion so that hydraulic fluid passes again into hose fitting 92 to withdraw the piston rods back into the cylinders. By viewing FIG. 7, it is seen that the forward movement of shaft 50 will tend to pull against cable 72 and to cause bed 32 to move forwardly. At the point shown in FIG. 7, the bed 32 is resting squarely on the ground surface and the rollers 104 at the rear of frame 18. The bed 32 begins to roll forwardly in its inclined position as shaft 50 moves forwardly. The bed 32 maintains this inclined position until the center of its mass passes over rollers 104, and then the forward end thereof tends to pivot immediately downwardly. However, the restraining action of cables 66 and 72, as well as the yieldable resistance being offered to the re-entry of the pistons into their respective cylinders, cushions this tendency of the forward end of the bed to pivot heavily onto the frame 18. Instead, the bed pivots slowly and gently onto track 28 on the frames and then is slidably moved forward on the truck to its initial position.

From the foregoing, it is seen that shaft 50 and the cables 66 and 72 permit one set of cylinders 78 and 80 to simultaneously slide and tilt the truck bed 32 while maintaining absolute control thereof at all times. Thus, my device will accomplish at least all of its stated objectives.

Some changes may be made in the construction and arrangement of my truck frame and retractable truck bed without departing from the real spirit and purpose of my invention, and it is my intention to cover by my claims, any modified forms of structure of use of mechanical equivalents which may be reasonably included within their scope.

I claim:

1. In combination, a horizontal elongated frame having forward and rearward ends, means under said frame to hold it in an elevated position with respect to a supporting surface, a first track extending along the sides of said frame, a bed slidably mounted on said track, a second track extending along the sides of said bed, a shaft extending transversely across said bed and rotatably mounted by its ends on said second track, first and second sheaves rotatably mounted on said shaft, a first elongated cable extending around a portion of said first sheave and having one of its ends secured to the forward end of said bed and the other of its ends secured to the forward end of said frame, a second elongated cable extending around a portion of said second sheave and having one of its ends secured to the rearward end of said bed and its other end secured to the rearward end of said frame, at least one hydraulic cylinder pivotally mounted on the forward end of said frame, a piston rod slidably extending from said cylinder in a rearwardly direction, means connecting the rearward end of said piston rod to said shaft, and a source of hydraulic fluid operatively connected to said cylinder.

2. In combination, a horizontal elongated frame having forward and rearward ends, means under said frame to hold it in an elevated position with respect to a supporting surface, a first track extending along the sides of said frame, a bed slidably mounted on said track, bracket means detachably connecting the sides of said frame and said bed to prevent lateral relative movement therebetween at times, a second track extending along the sides of said bed, a shaft extending transversely across said bed and rotatably mounted by its ends on said second track, first and second sheaves rotatably mounted on said shaft, a first elongated cable extending around a portion of said first sheave and having one of its ends secured to the forward end of said bed and the other of its ends secured to the forward end of said frame, a second elongated cable extending around a portion of said second sheave and having one of its ends secured to the rearward end of said bed and its other end secured to the rearward end of said frame, power means pivotally mounted on said frame, and means operatively connecting said power means and said shaft whereby said power means can selectively move said shaft alternately forwardly and rearwardly relative to said frame.

References Cited in the file of this patent

UNITED STATES PATENTS

| | | |
|---|---|---|
| 467,939 | Lawrence | Feb. 2, 1892 |
| 2,370,489 | Reed | Feb. 27, 1945 |
| 2,906,413 | Minty | Sept. 29, 1959 |
| 2,982,430 | Clifton | May 2, 1961 |